(12) United States Patent
Charlier et al.

(10) Patent No.: US 6,192,253 B1
(45) Date of Patent: Feb. 20, 2001

(54) WRIST-CARRIED RADIOTELEPHONE

(75) Inventors: Michael L. Charlier, Palatine; Neil Mehta, Crystal Lake; Aaron L. Dietrich, Loves Park; Paul R. Steuer, Hawthorn Woods, all of IL (US)

(73) Assignee: Motorola, Inc.

( * ) Notice: Under 35 U.S.C. 154(b), the term of this patent shall be extended for 0 days.

(21) Appl. No.: 09/413,600

(22) Filed: Oct. 6, 1999

(51) Int. Cl.[7] .................. H04B 1/38; H04M 1/00
(52) U.S. Cl. ............ 455/550; 455/90; 455/347; 455/350; 455/340
(58) Field of Search .................. 455/340, 341, 455/344, 351, 90, 575, 347, 100, 350, 556, 550; 379/433

(56) References Cited

U.S. PATENT DOCUMENTS

| | | | |
|---|---|---|---|
| 3,032,651 | 5/1962 | Gisiger-Stähli et al. | 250/14 |
| 3,971,206 | 7/1976 | Martino | 58/88 |
| 3,973,706 | 8/1976 | Boyce et al. | 224/4 |
| 4,141,074 * | 2/1979 | Popper | 364/705 |
| 4,194,355 | 3/1980 | Nishida | 368/282 |
| 4,334,315 | 6/1982 | Ono et al. | 455/11 |
| 4,427,303 * | 1/1984 | Matthias | 368/282 |
| 4,754,285 | 6/1988 | Robitaille | 343/718 |
| 4,821,532 | 4/1989 | Jaques et al. | 63/3 |
| 4,847,818 * | 7/1989 | Olsen | 368/10 |
| 4,972,394 | 11/1990 | DiMarco | 368/227 |
| 5,008,864 * | 4/1991 | Yoshitake | 368/10 |
| 5,235,560 * | 8/1993 | Seager | 368/10 |
| 5,235,561 | 8/1993 | Seager | 368/10 |
| 5,239,521 * | 8/1993 | Blonder | 368/10 |
| 5,265,265 | 11/1993 | Hama et al. | 455/300 |
| 5,388,155 * | 2/1995 | Smith | 379/446 |
| 5,467,324 * | 11/1995 | Houlihan | 368/10 |
| 5,615,179 * | 3/1997 | Yamamoto et al. | 368/281 |
| 5,742,894 * | 4/1998 | Jambhekar et al. | 455/90 |
| 5,872,744 * | 2/1999 | Taylor | 368/13 |
| 5,889,737 * | 3/1999 | Alameh et al. | 368/204 |
| 5,982,881 * | 12/1999 | Mischenko | 379/433 |
| 6,009,336 * | 12/1999 | Harris et al. | 455/566 |
| 6,044,153 * | 3/2000 | Kaschke | 379/433 |

FOREIGN PATENT DOCUMENTS

PCT/US90/ 04263 * 3/1991 (WO) .................. H05K/11/00

* cited by examiner

Primary Examiner—Lee Nguyen
Assistant Examiner—Marceau Milord
(74) Attorney, Agent, or Firm—Brian Mancini

(57) ABSTRACT

An improved wrist-carried radiotelephone includes a first housing including a microphone, a display and a radio transceiver. A second housing includes a latch, a user interface, a speaker, and a removable battery. A flexible wristband has a first portion including an antenna extending downwardly and a latch clip at one end thereof operable to be received in the latch of the second housing. A second portion of the wristband includes electrical connections to connect the circuits of the first and second housing. The wristband includes support members to maintain the wrist-carrier radiotelephone in a predetermined configuration when the first portion of the wristband is unlatched from the second housing such that the speaker and microphone of the radiotelephone are at an optimum orientation in relation to a user's ear and mouth.

20 Claims, 3 Drawing Sheets

WRIST-CARRIED RADIOTELEPHONE

FIELD OF THE INVENTION

The present invention relates generally to wrist-carried radiotelephones, and more particularly to a circuit arrangement for a wrist-carried radiotelephone.

BACKGROUND OF THE INVENTION

Consumer markets continue to request smaller portable electronic devices that have greater functional features. Examples of such devices include two-way and broadcast radio receivers (i.e., Walkman®), compact disc players, cellular telephones, and computer devices to name but a few. As portable electronic devices have become smaller, a variety of carrying means have been developed. These carrying means have included belt-mounted carrying cases that have gained particular acceptance in applications such as portable radios and compact disc players. Further, as such devices have become smaller, they have become more compatible with wearing in more convenient places, such as, for example, on the wrist. An example of this type of device, might be, for example, a one-way call receiver, such as a portable paging device. Pagers that are worn on the wrist have long been incorporated into wristwatch type devices. In these devices, the pager and the watch are an integral unit. Radiotelephones, however, have much more circuitry than a pager and require more power. Prior art efforts to incorporate radiotelephone circuitry, a speaker, and a battery into this type of integral unit resulted in a device that is bulky and unattractive. In addition, the placement of the battery often makes it difficult to replace. Radiotelephones that are bulky and hard to use have not found success in the marketplace.

The marketplace also demands that radiotelephones have a privacy-mode of operation. Typically, the size and location of a watchphone is not amenable to a straightforward location for a speaker and microphone that matches a user's mouth to ear orientation and spacing in a comfortable manner. Further, the inherent flexibility of a watchband makes it awkward to use and hold in a constant and comfortable position using one hand. One solution to this (U.S. Pat. No. 5,235,560) is to use a rigid wristband. However, this does not allow adjustment to different user wrist sizes and requires complicated manual maneuvering of the wristband before the radiotelephone can be used. Another solution (U.S. Pat. No. 4,847,818) describes a microphone and speaker being separated on a wristband. However, this solution has a non-adjustable wristband due to an antenna being located throughout both portions of the wristband. Moreover, the wristband is flexible which makes it awkward to use and hold in a constant and comfortable position using only one hand.

It is also desired in the marketplace that a radiotelephone be capable of operating in a speakerphone mode of operation. To provide this, a larger more powerful speaker is needed than is available in prior art watchphones which utilize small speakers that can not provide sufficient volume for a speakerphone mode of operation.

Accordingly, there is a need for a wrist-carried radiotelephone that has a flexible adjustable wristband to fit a user's wrist and that can maintain a substantially fixed orientation when unclasped. There is also a need for a radiotelephone that carries a larger speaker for speakerphone operation without being obtrusive or overly bulky. It would also be of benefit to provide a wrist-carried radiotelephone with a battery that can be removed without removing the radiotelephone from the wrist or losing memory. There is also a need for a wrist-carried radiotelephone that provides an easy-to-use privacy mode of operation. It would also be beneficial to provide a device that has a good form factor, can be worn and used easily, and has an aesthetic appearance.

DETAILED DESCRIPTION OF THE PREFERRED EMBODIMENTS

Figure 1:
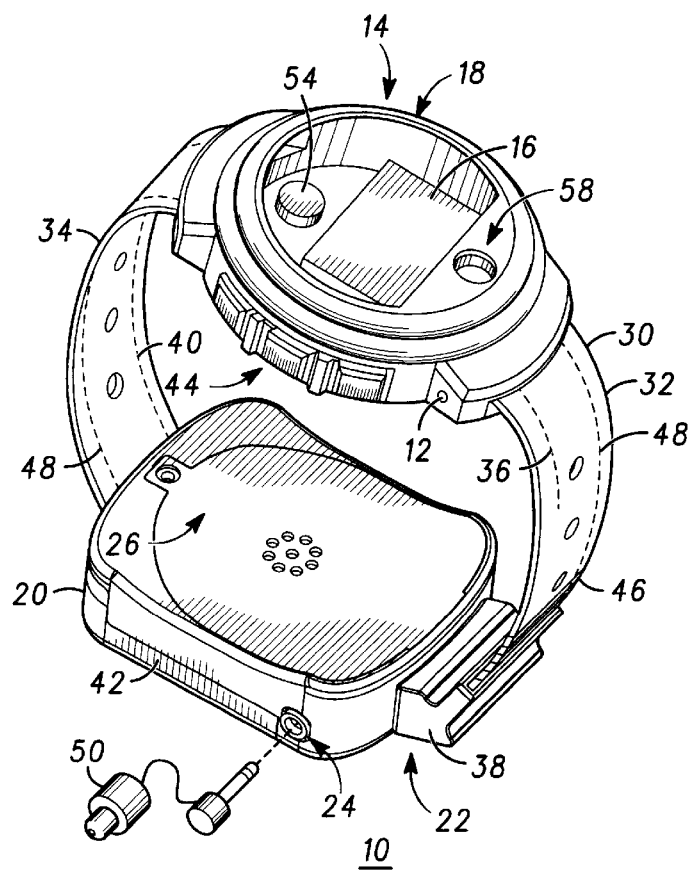
FIG. 1 illustrates a perspective view of a wrist-carried radiotelephone, in accordance with the present invention.

The present invention provides a wrist-carried radiotelephone that is easily and comfortably operated in private or non-private mode. The configuration for the present invention includes the radiotelephone circuitry and display located in a first housing of the device and a battery and speaker located in a second housing of the device. As a result, the radiotelephone is not bulky, can be worn and used easily, is adjustable to fit differently-sized wrists, and has an aesthetic appearance. This configuration also allows an easily changeable battery without removing the radiotelephone from the wrist.

While the specification concludes with claims defining the features of the invention that are regarded as novel, it is believed that the invention will be better understood from a consideration of the following description in conjunction with the drawing figures, in which like reference numerals are carried forward. A radiotelephone is a device which communicates information using electromagnetic waves in the radio frequency range. "Wrist-carried" means that a device is strapped to or otherwise secured to a user's wrist. Therefore, a wrist-carried radiotelephone is a radiotelephone adapted to be secured to a user's wrist to provide portable, lightweight and convenient access to radiotelephone communications.

The radiotelephone portion of the wrist-carried radiotelephone is preferably a cellular radiotelephone adapted for personal communication or personal computing, but may also be a cordless radiotelephone or a personal communication service (PCS) radiotelephone. The radiotelephone portion may be constructed in accordance with an analog communication standard or a digital communication standard. The radiotelephone portion generally includes a radio frequency (RF) transmitter, an RF receiver, an RF front end, a controller, an antenna, a battery, a display, control switches, a microphone, a speaker, a frequency synthesizer, a signal processor, and a user interface including various jacks and connections. The radiotelephone portion can also include a paging receiver. The device can also include an audio alert or vibrator. The electronics incorporated into a watch, or for that matter, a portable cellular phone, two-way radio or selective radio receiver, such as a pager, are well known in the art, and can be incorporated into the communication device.

Referring now to FIGS. 1–4, there is illustrated a view of a wrist-carried radiotelephone 10, in accordance with the present invention. A first housing 18 includes a microphone 12, a display 14 (shown as transparent) and circuitry of a radio transceiver 16. The display is adapted to show the time, display messages or information, or to show user interface functions of the radiotelephone. The display can additionally contain a keypad (not shown) or other user interface 44, such as buttons or knobs, to scroll through screen menus on the display. It is preferred that a keypad not be used due to space limitations and problems using small keys. Instead it is preferred that the radiotelephone include at least a minimal voice recognition system to input numbers or recall presets.

Figure 6:
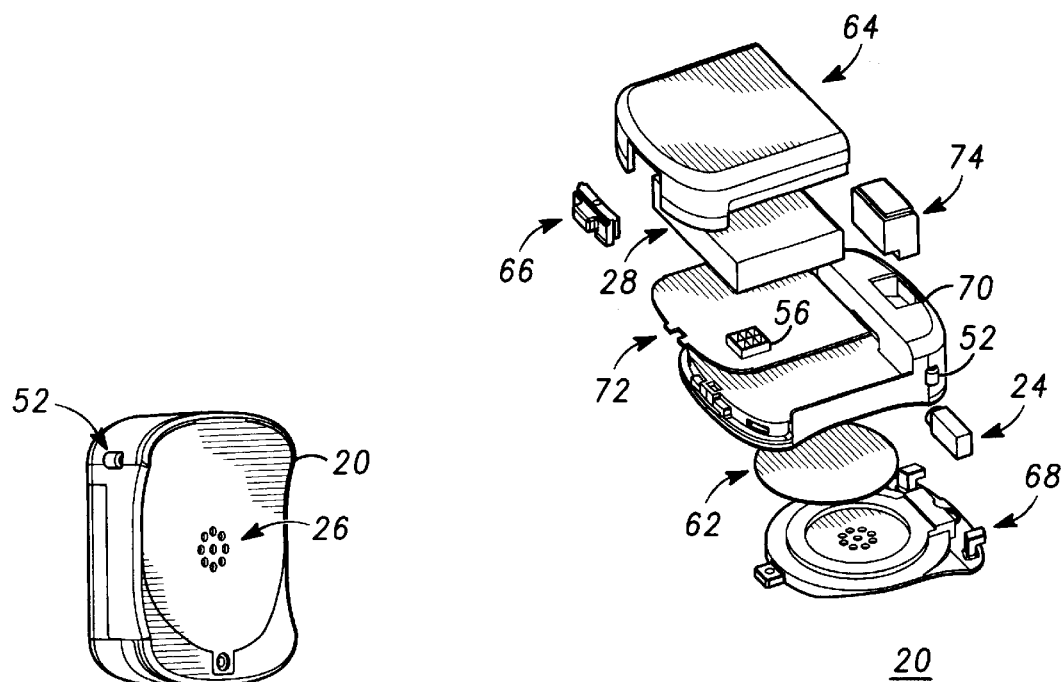
FIG. 6 shows an exploded view of the battery/speaker housing of the wrist-carried radiotelephone of FIG. 1.

A second housing 20 includes a latch 22, a user interface 24, a speaker 26 facing inwardly when worn on the wrist, and a removable battery (28 in FIG. 6). The battery is used to provide power to the radiotelephone circuitry including the radio transceiver 16. The housings 18,20 can also include circuits comprising at least one of a vibrator, an alert, a card reader, a subscriber identification module (SIM) chip, and an extra memory slot for additional memory to be used for additional features such as game play, expanded voice recognition, an MP3 player, and the like.

Figure 7:
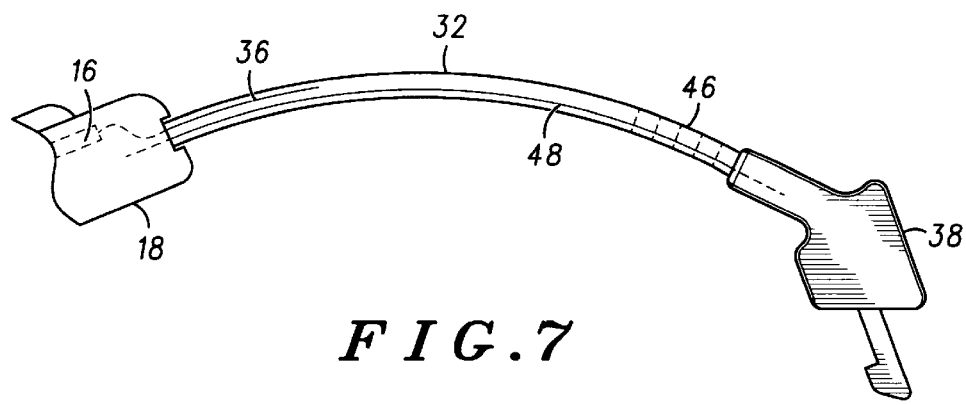
FIG. 7 illustrates a cross sectional view of a first portion of a wristband of the wrist-carried radiotelephone FIG. 3.
Figure 2:
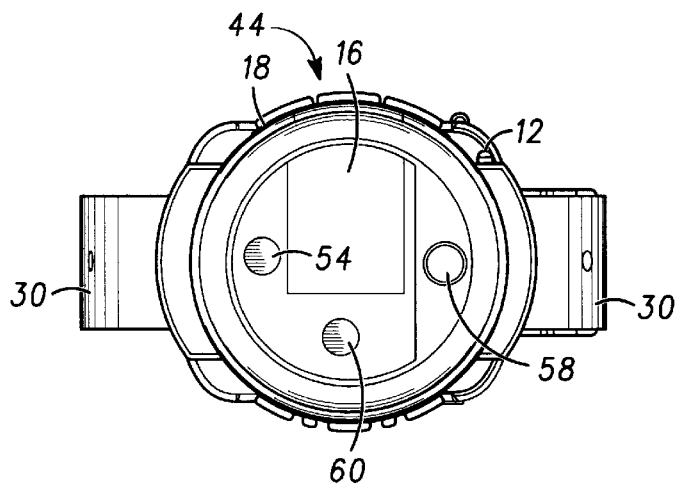
FIG. 2 illustrates a top view of the wrist-carried radiotelephone of FIG. 1.
Figure 3:
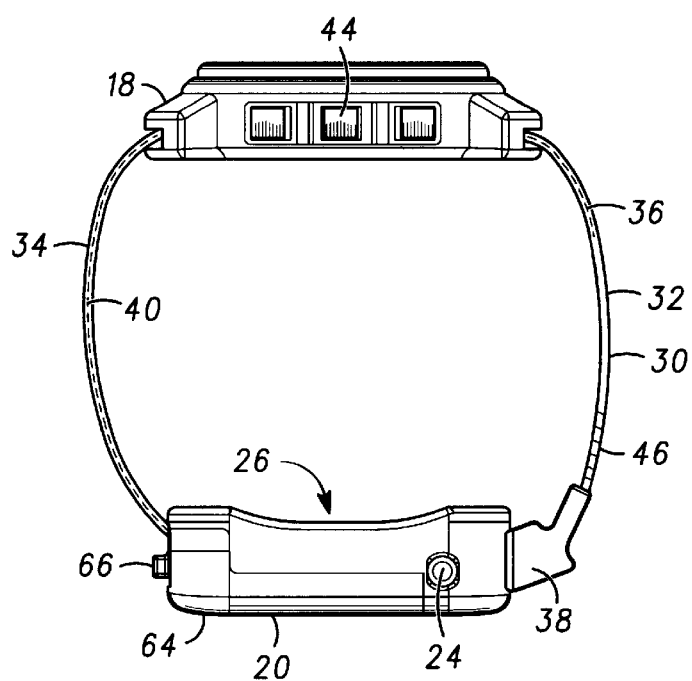
FIG. 3 illustrates a side view of the wrist-carried radiotelephone of FIG. 1.
Figure 4:
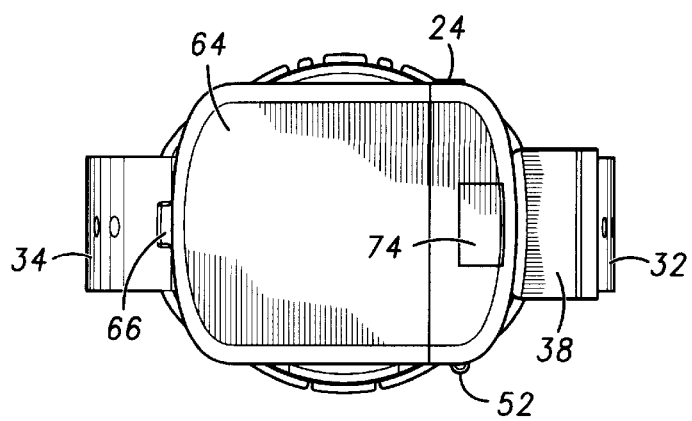
FIG. 4 illustrates a bottom view of the wrist-carried radiotelephone of FIG. 1.
Figure 5:
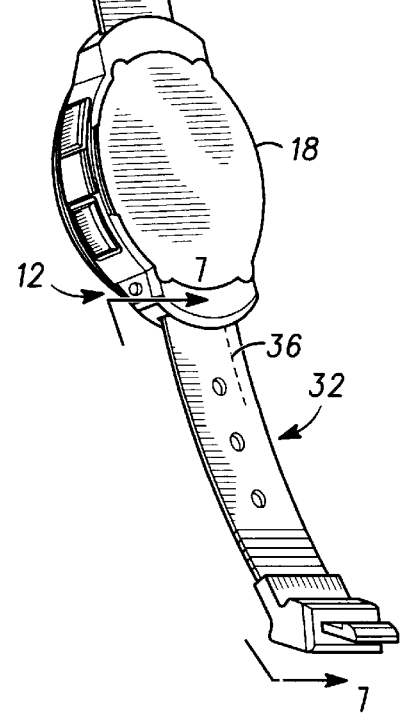
FIG. 5 illustrates a perspective view of an operational position of the wrist-carried radiotelephone of FIG. 1.

A flexible wristband 30 having first and second portions 32,34 is mechanically coupled to both sides of the first housing 18, the first portion 32 includes an antenna 36 extending outwardly from the first housing in the first portion 32 and is electrically coupled to the radio transceiver 16 of the first housing 18. A latch clip 38 at one end of the first portion 32 is operable to be received in the latch 22 of the second housing 20. The second portion 34 of the wristband 30 is mechanically coupled between the first and second housing and includes electrical connections 40 (see FIGS. 3 and 7) to connect the circuits of the first and second housing. Preferably, the electrical interconnections are flex circuits as are known in the art. The wristband 30 also includes support members 48 (see FIG. 7) to maintain the wrist-carrier radiotelephone 10 in a substantially fixed, predetermined configuration when the first portion 32 of the wristband 30 is unlatched from the second housing 20 such that the speaker 26 and microphone 12 of the radiotelephone 10 are at an optimum orientation (as shown in FIG. 5) in relation to a user's ear and mouth. The support members can be of a preformed plastic, spring steel or memory metal.

The second housing 20 has a removable or hinged cover 42 to allow easy removal of the battery without removing the wristband 30 from the user's wrist. Preferably, the battery and cover comprise a removable module. More preferably, the battery module includes an integral alert. This provides a particular advantage as a user's wrist is very sensitive to vibration and less power would be needed to provide a suitable alert signal. Another advantage of having the battery located on the second housing is providing the ability to mount a larger battery module without removing or modifying the radiotelephone.

The user interface 24 of the second housing 20 includes circuits comprising at least one of an earpiece jack, a data interface connection, and a battery charging jack. Preferably, the user interface 24 is an earpiece jack connectable with a wired earpiece 50 that, when connected to the earpiece jack, serves to disconnect the speaker 26 such that a user can operate the radiotelephone 10 in a privacy mode with removal from the user's wrist. More preferably, the latch clip 38, when disconnected from the second housing 20, connects the speaker 26 and disconnects the earpiece jack 24, and when connected to the second housing 20 disconnects the speaker 26 and connects the earpiece jack 24. Alternatively, the user interface includes a radio transmitter for transmitting to a remote earpiece or speaker, the radio transmitter directs modulated audio signals to be picked up by the remote earpiece or speaker during user communications. It is also envisioned that a radio transmitter can be used to send signals to an FM receiver such as a car radio. Optionally, the user interface includes an auxiliary radio transceiver for sending and receiving modulated audio signals from a remote headset that includes an auxiliary microphone and earpiece. The auxiliary radio transceiver directs modulated audio signals between the headset and the radiotelephone during user communications.

In a preferred embodiment, the first portion 32 of the wristband 30 includes an adjustable portion 46, or sizing links, near the latch clip 38, that can be adjusted to properly fit a user's wrist. Also, a speaker volume adjustment control (52 in FIGS. 4–6) is located on second housing 20 such that a user can adjust the speaker volume to a comfortable level during a conversation. In addition, a backup clock battery 54 can be located in the first or second housing 18, 20 such that the radiotelephone battery 28 can be replaced without losing the clock time or the radiotelephone settings in a memory. In the event that the radiotelephone battery 28 is low on power or needs reserve power, the watch circuitry remains operational or reserve power can be supplied to the radiotelephone by the backup clock battery 54. Moreover, a factory or field service programming jack 56 can be provided for reprogramming functions of the radiotelephone. The programming jack is concealed by the battery 28 in the second housing 20. Preferably, the programming jack is a terminal of a flex circuit coupled to the circuitry of the second housing, and is adapted to be received in a zero insertion force (ZIF) socket of a field or service programmer. The flex terminal can be folded down flat and held in place with a service label when not in use. Advantageously, the flex terminal provides the least obtrusive profile possible.

Additionally, the radiotelephone can include a data link interface 58 located in the first or second housings 18,20. The data link interface 58 provides access to external data sources via one of a wired link, an optical link such as a visible light link, a wireless IR link, and a wireless RF link. Preferably the data link interface has an optimum orientation directed substantially parallel to a plane of the display of the radiotelephone, wherein a signal from the data link interface can be comfortably directed to a desktop device, such as a computer, games interface, and the like.

In operation, as represented in FIG. 5, when the latch clip is unlatched from the second housing the support members in the wristband uncoil the wristband such that the radiotelephone conforms to a substantially fixed, specific angle to optimize ear to mouth orientation of the phone while having the antenna directed away from the first housing, below the microphone, such that a user operating the radiotelephone has the antenna oriented in a downwardly fashion.

The downward orientation of the antenna has shown to provide improved signaling with less power as the antenna is located away from the head and hand of the user which can degrades signal quality, as with the more traditional upward pointing antenna of standard cellular phones. In addition, the segmentation of the radiotelephone into the dual housing approach of the present invention disperses the volume and weight of the device when worn on the wrist. This space efficient packaging provides a low-profile form factor that is comfortable to use and wear while reducing interference with clothing.

FIG. 6 shows the assemblies of the battery 28 and speaker 62 in the second housing 20. A battery cover 64 or the battery module is captured by a cover latch 66. The battery cover 64 can be completely removable or hinged on the second housing 20 so as to facilitate removal of the at least one battery 28 while the user is wearing the radiotelephone. Removal of the battery 28 or module simply involves pressing the cover latch 66 to release the battery cover 64, opening or removing the battery cover 64, and removing the battery 28. Alternatively, the battery 28 battery cover 64, cover latch 66, and battery back cover 72 can be a single replaceable module. The second housing 20 or module also serve to contain any battery leakage that may occur. The speaker 62 can be of a piezoelectric or dynamic variety as are known in the art, and is held in the second housing 20 by an earpiece baffle 68. It is preferred that the speaker is a piezoelectric due to its smaller size and more efficient power use. Optionally, the battery and speaker assemblies are separated by a housing divider 70, and a battery back cover 72 can be provided to further isolate the battery assembly from the housing. An optional data connection 56 is shown for reprogramming the radiotelephone. The data connection 56 can also be located as a jack on the housing, also. A latch release button 74 is provided to allow easy unlatching of the latch clip 38 of the wristband.

The configuration of the second housing 20, battery 28 and speaker 62 provide maximum flexibility in a wide variety of implementations and alterations. Moreover, conventional sized batteries, such as button cells, which are readily available, can be used in the present invention. Alternatively, differently sized battery modules can be provided. Convenient battery changing is important in the present invention as the batteries are much smaller than those available in standard cellular phones, and will need to be changed more often, even with the advent of exotic material technologies providing more powerful batteries, such as a lithium cell, for example. It is expected that a battery/housing configuration as described above can provide enough capacity (using a 23×23×6 mm Li-Polymer cell, for example) to power the radiotelephone circuitry for about one hour of conversation during a telephone call and for about twenty hours in a standby mode waiting to receive a call.

The wrist-carried radiotelephone can provide separate circuitry disposed in the first or second housings, so as to provide a time of day on the display for example, with or without a separate watch battery disposed in the housing to provide power only to the watch circuitry or back-up power to the radiotelephone. Thus, in the event that the radiotelephone battery is low on power, the watch circuitry remains operational. In addition, a separate watch battery can be used to maintain the memory of the radiotelephone while charging or when changing its battery or to provide reserve power to the radiotelephone when needed. A watch is a portable timepiece. Therefore, the wrist-carried radiotelephone combines the functions of a portable timepiece and a radiotelephone into a single unit. However, preferably the radiotelephone uses its own internal timing to provide a clock function on the display without need for separate watch circuitry.

With the advent of voice recognition software there is no longer a need for a standard keypad on a wrist-carried radiotelephone. However, a standard twelve-key keypad could be located on the display, housing or wristband. With voice recognition, only a microphone and possibly a knob or some keys (activate/deactivate and function key) would be needed. These keys could be conveniently located on the display, housing or wristband. Further, the display could contain a touch screen that is menu driven.

Several modes of operation of the present invention can be used. Firstly, there are non-traditional modes of operation available such as internet access or game play. These could be accessed through the data link 58. Another mode of operation permits non-private speakerphone operation where the user can hear the speaker without placing any device near the ear. Advantageously, the present invention provides a side-mount microphone which allows positioning of the device on a desk, for example, with the speaker facing up while still having direct line-of-sight access to the microphone. However, the present invention provides a particular advantage in a privacy mode of operation wherein the location and spacing of the microphone and speaker can be located in close proximity to a user's mouth and ear. Moreover, with an optional remote wired or wireless earpiece or speaker the radiotelephone does not need to be removed from the wrist to be operated.

The present invention also contemplates the use of different antenna configurations. It is preferred that the antenna is flexible and conveniently concealed within the wristband (see FIG. 7). This is unobtrusive to the user requiring no additional actions on their part. However, other accommodations for the antenna are also contemplated in the present invention. Most simply, the antenna can be a rigid helical antenna protruding from one of the housings. Another possibility is to provide a protruding, extendable antenna as is provided in standard cellular phones. This too is viable but can become obtrusive to a user, interfering with arm motions or catching on a users clothes. The present invention contemplates several non-protruding antenna configurations to resolve these difficulties. These configurations include loop, monopole, and dipole configurations. Each of these configurations can be stationary, or movable to provide increased efficiency. Preferably, these configurations are concealed within the wristband of the radiotelephone. With any of the above antenna configurations, one or both ends of the antenna can be variably loaded, based on whether the antenna is retracted or extended.

It is to be understood that the phraseology or terminology employed herein is for the purpose of description and not of limitation. Accordingly, the invention is intended to embrace all such alternatives, modifications, equivalents and variations as fall within the broad scope of the appended claims.

What is claimed is:

1. An improved wrist-carried radiotelephone, comprising:
   a first housing including a microphone, a display and a radio transceiver;
   a second housing including a latch, a speaker facing inwardly when worn on the wrist, and a removable battery; and
   a flexible wristband having a first and second portions being mechanically coupled to the first housing, the first portion including an antenna extending downwardly in the first portion and being electrically coupled to the radio transceiver of the first housing and a latch clip at one end thereof operable to be received in the latch of the second housing, the second portion including electrical connections to connect the circuits of the first and second housing, the wristband including support members to maintain the wrist-carrier radiotelephone in a predetermined configuration when the first portion of the wristband is unlatched from the second housing such that the speaker and microphone of the radiotelephone are at an optimum orientation in relation to a user's ear and mouth; and
   a user interface in the second housing, the user interface including an earpiece jack, the speaker being switchably connected to the latch and the earpiece jack such that when the latch is disconnected from the latch clip and the earpiece jack is not being used the speaker is operable, and when one of the latch is connected to the latch clip and the earpiece jack is being used then the speaker is disabled.

2. The wrist-carried radiotelephone according to claim 1, wherein the user interface of the second housing includes circuits comprising at least one of a data interface connection, a battery charging jack, and an additional memory slot, and the first housing includes circuits comprising at least one of a card reader and a subscriber identification module (SIM) chip.

3. The wrist-carried radiotelephone according to claim 1, wherein the earpiece jack is connectable with a wired earpiece that, when connected to the earpiece jack, serves to disconnect the speaker such that a user can operate the radiotelephone in a privacy mode with removal from the user's wrist.

4. The wrist-carried radiotelephone according to claim 1, wherein the latch clip when disconnected from the second housing connects the speaker and disconnects the earpiece jack, the latch clip when connected to the second housing disconnects the speaker and connects the earpiece jack.

5. The wrist-carried radiotelephone according to claim 1, wherein the battery is removable from the second housing without removing the wrist-carried radiotelephone from the user's wrist.

6. The wrist-carried radiotelephone according to claim 1, wherein when the latch clip is unlatched from the second housing the antenna is directed away from and downwardly from the first housing such that a user operating the radiotelephone has the antenna oriented in a downwardly fashion.

7. The wrist-carried radiotelephone according to claim 1, wherein the wristband includes an adjustable portion near the latch clip that is adjustable to fit a wrist of the user.

8. The wrist-carried radiotelephone according to claim 1, further comprising a radio transmitter for transmitting to a remote earpiece, the radio transmitter directs modulated audio signals to be picked up by the remote earpiece during user communications.

9. The wrist-carried radiotelephone according to claim 1, further comprising an auxiliary radio transceiver for sending and receiving modulated audio signals from a remote headset that includes an auxiliary microphone and earpiece.

10. The wrist-carried radiotelephone according to claim 1, further comprising a speaker volume adjustment control on the second housing such that a user can adjust speaker volume to a comfortable level during a conversation.

11. The wrist-carried radiotelephone according to claim 1, further comprising a backup clock battery such that the battery can be replaced without losing radiotelephone memory.

12. The wrist-carried radiotelephone according to claim 1, further comprising and a programming connection concealed by the battery, the programming connection for reprogramming functions of the radiotelephone.

13. The wrist-carried radiotelephone according to claim 1, further comprising at least one of a vibrator and an alert.

14. The wrist-carried radiotelephone according to claim 1, further comprising a data link interface in the first housing, the data link interface being accessible to external data sources via one of a wired link, an optical link, a wireless IR link, and a wireless RF link.

15. An improved wrist-carried radiotelephone, comprising:
  a first housing including a microphone, a display, a radio transceiver, and a backup clock battery for retaining radiotelephone memory;
  a second housing including a latch, a speaker facing inwardly when worn on the wrist, and a battery being removable from the second housing without removing the wrist-carried radiotelephone from a user's wrist;
  a flexible wristband having a first and second portions being mechanically coupled to the first housing, the first portion including an antenna extending downwardly in the first portion and being electrically coupled to the radio transceiver of the first housing and an adjustable latch clip at one end thereof operable to be received in the latch of the second housing, the second portion including electrical connections to connect the circuits of the first and second housing, the wristband including support members to maintain the wrist-carrier radiotelephone in a predetermined configuration when the first portion of the wristband is unlatched from the second housing such that the speaker and microphone of the radiotelephone are at an optimum orientation in relation to a user's ear and mouth; and
  a user interface in the second housing, the user interface including an earpiece jack, the speaker being switchably connected to the latch and the earpiece jack such that when the latch is disconnected from the latch clip and the earpiece jack is not being used the speaker is operable, and when one of the latch is connected to the latch clip and the earpiece jack is being used then the speaker is disabled.

16. The wrist-carried radiotelephone according to claim 15, wherein the user interface of the second housing includes circuits comprising at least one of a earpiece jack, a data interface connection, a battery charging jack, and an additional memory slot, and the first housing includes circuits comprising at least one of a card reader and a subscriber identification module (SIM) chip.

17. The wrist-carried radiotelephone according to claim 15, further comprising a speaker volume adjustment control on the second housing such that a user can adjust speaker volume to a comfortable level during a conversation.

18. The wrist-carried radiotelephone according to claim 15, further comprising a data link interface in the first housing, the data link interface being accessible to external data sources via one of a wired link, an optical link, a wireless IR link, and a wireless RF link.

19. An improved wrist-carried radiotelephone, comprising:
  a first housing including a microphone, a display, a radio transceiver, and a backup clock battery for retaining radiotelephone memory;
  a second housing including a latch, a speaker facing inwardly when worn on the wrist, and a battery being removable from the second housing without removing the wrist-carried radiotelephone from a user's wrist;
  a flexible wristband having a first and second portions being mechanically coupled to the first housing, the first portion including an antenna extending downwardly in the first portion and being electrically coupled to the radio transceiver of the first housing and an adjustable latch clip at one end thereof operable to be received in the latch of the second housing, the second portion including electrical connections to connect the circuits of the first and second housing, the wristband including support members to maintain the wrist-carrier radiotelephone in a predetermined configuration when the first portion of the wristband is unlatched from the second housing such that the speaker and microphone of the radiotelephone are at an optimum orientation in relation to a user's ear and mouth;

a user interface in the second housing, the user interface including an earpiece jack, the speaker being switchably connected to the latch and the earpiece jack such that when the latch is disconnected from the latch clip and the earpiece jack is not being used the speaker is operable, and when one of the latch is connected to the latch clip and the earpiece jack is being used then the speaker is disabled;

a speaker volume adjustment control on the second housing such that a user can adjust speaker volume to a comfortable level during a conversation; and a data link interface in the first housing, the data link interface being accessible to external data sources via one of a wired link, an optical link, a wireless IR link, and a wireless RF link.

20. The wrist-carried radiotelephone according to claim 19, wherein the user interface of the second housing includes circuits comprising at least one of a earpiece jack, a data interface connection, a battery charging jack, and an additional memory slot, and the first housing includes circuits comprising at least one of a card reader and a subscriber identification module (SIM) chip.

* * * * *